US007800253B2

(12) United States Patent
Hubbard et al.

(10) Patent No.: US 7,800,253 B2

(45) Date of Patent: Sep. 21, 2010

(54) TRANSMITTING SIGNALS OVER INTERCONNECT CARRYING DIRECT CURRENT FROM POWER SUPPLY TO ELECTRONIC DEVICE

(75) Inventors: Nikholas Hubbard, Vancouver, WA (US); Robert Niemand, Vancouver, WA (US); Robert Ray, Camas, WA (US); Ron Juve, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2038 days.

(21) Appl. No.: 10/743,230

(22) Filed: Dec. 21, 2003

(65) Prior Publication Data

US 2005/0135120 A1 Jun. 23, 2005

(51) Int. Cl.
*H01H 9/54* (2006.01)

(52) U.S. Cl. .................................................. 307/140

(58) Field of Classification Search ................. 307/140
See application file for complete search history.

(56) References Cited

U.S. PATENT DOCUMENTS

| | | | | |
|---|---|---|---|---|
| 3,949,172 | A | 4/1976 | Brown et al. | |
| 4,123,748 | A | 10/1978 | Otani | |
| 4,639,714 | A | 1/1987 | Crowe | |
| 4,779,071 | A | 10/1988 | Guglielmo | |
| 4,835,516 | A | 5/1989 | Kutschera et al. | |
| 5,051,720 | A | 9/1991 | Kittirutsunetorn | |
| 5,297,015 | A * | 3/1994 | Miyazaki et al. | 363/146 |
| 5,644,286 | A | 7/1997 | Brosh et al. | |
| 5,995,020 | A | 11/1999 | Owens et al. | |
| 6,239,879 | B1 | 5/2001 | Hay | |
| 6,281,606 | B1 | 8/2001 | Westlake | |
| 6,459,175 | B1 * | 10/2002 | Potega | 307/149 |
| 6,496,104 | B2 | 12/2002 | Kline | |
| 7,126,241 | B2 * | 10/2006 | Popescu-Stanesti et al. | 307/29 |
| 7,514,814 | B2 * | 4/2009 | Menas et al. | 307/38 |
| 2004/0258141 | A1 * | 12/2004 | Tustison et al. | 375/219 |

* cited by examiner

*Primary Examiner*—Robert L. DeBeradinis

(57) ABSTRACT

A system of an embodiment of the invention is disclosed that includes an interconnect, an electronic device, and a power supply. The interconnect is to carry direct current (DC). The electronic device is connectable to the interconnect to receive DC, and has a communication circuit to transmit signals over the interconnect. The power supply is connectable to the interconnect to provide the DC to the electronic device, and has a decoder circuit to decode the signals received over the interconnect from the electronic device.

28 Claims, 5 Drawing Sheets

INTERCONNECT 106
108
216
219
222
218
110
ELECTRONIC DEVICE
204
208
102
COMM CIRCUIT 206
COUPLER 212
SIGNAL GENERATOR 214
DECODER CIRCUIT
SIGNAL DETECTOR 210
PRINCIPAL COMPONENTS 202
POWER SUPPLY
226
104
230
DECODER CIRCUIT
SIGNAL DETECTOR 232
COMM CIRCUIT 228
COUPLER 234
SIGNAL GENERATOR 236
PRINCIPAL COMPONENTS 224
AC
112
114
100

100
ELECTRONIC DEVICE
102
PRINCIPAL COMPONENTS 202
208
DECODER CIRCUIT
204
SIGNAL DETECTOR 210
COMM CIRCUIT 206
COUPLER 212
SIGNAL GENERATOR 214
112
AC
114
POWER SUPPLY
104
PRINCIPAL COMPONENTS 224
226
COMM CIRCUIT 228
COUPLER 234
SIGNAL GENERATOR 236
DECODER CIRCUIT
SIGNAL DETECTOR 232
230
INTERCONNECT 106
108
216
219
222
218
110

COMMUNICATION CIRCUIT
300
108
304
SIGNAL GENERATOR
302
110
FROM PRINCIPAL
COMPONENTS
306

COMMUNICATION CIRCUIT
300
108
404
SIGNAL GENERATOR
302
110
FROM PRINCIPAL
COMPONENTS
306

500
DECODER CIRCUIT
108
502
510
508
512
506
504
110
TO PRINCIPAL COMPONENTS
516

500
DECODER CIRCUIT
108
502
604
602
110
TO PRINCIAPAL COMPONENTS
516

500
DECODER CIRCUIT
108
502
706
704
708
702
710
110
516
TO PRINCIPAL COMPONENTS
712

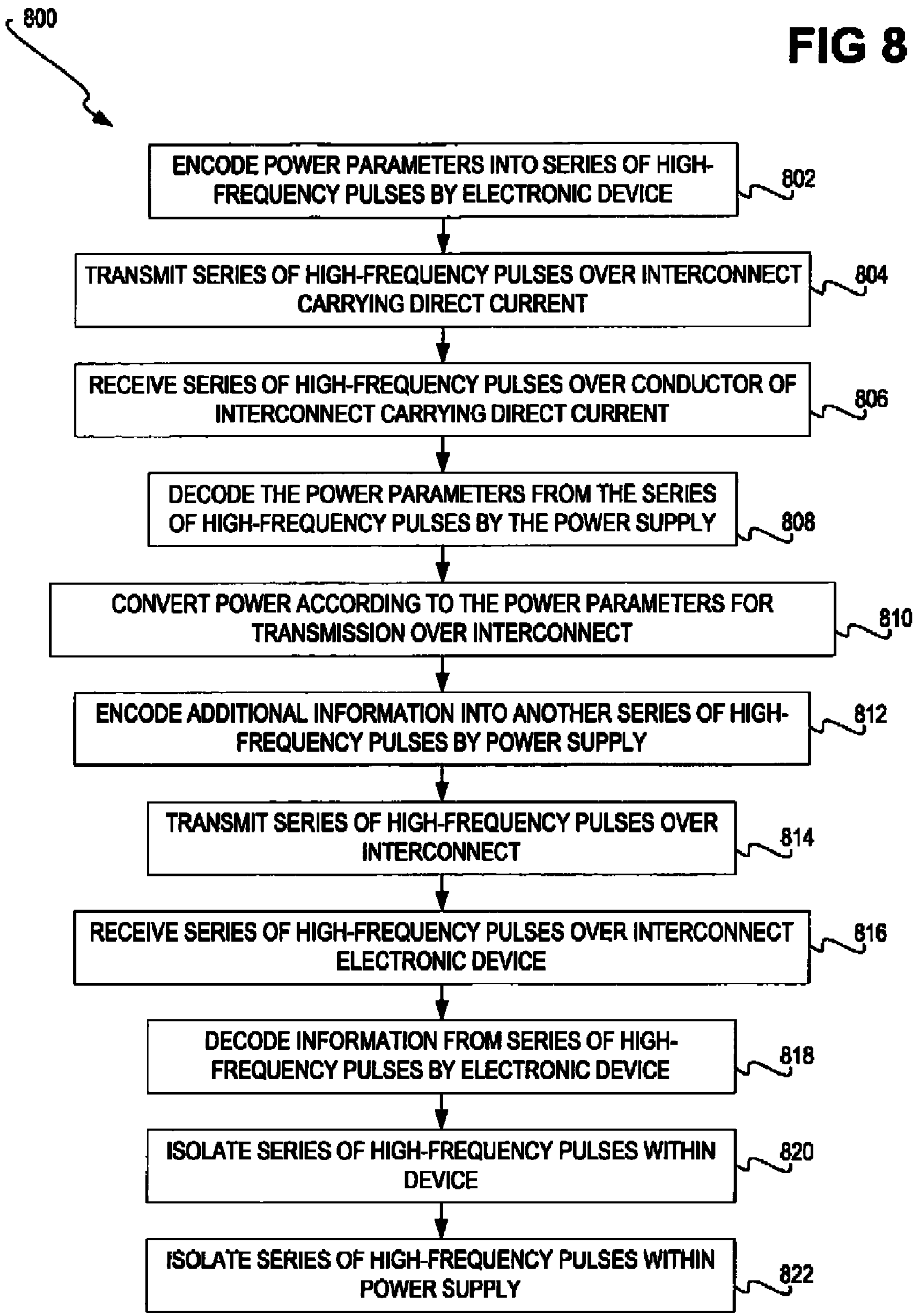
800
FIG 8
ENCODE POWER PARAMETERS INTO SERIES OF HIGH-FREQUENCY PULSES BY ELECTRONIC DEVICE
802
TRANSMIT SERIES OF HIGH-FREQUENCY PULSES OVER INTERCONNECT CARRYING DIRECT CURRENT
804
RECEIVE SERIES OF HIGH-FREQUENCY PULSES OVER CONDUCTOR OF INTERCONNECT CARRYING DIRECT CURRENT
806
DECODE THE POWER PARAMETERS FROM THE SERIES OF HIGH-FREQUENCY PULSES BY THE POWER SUPPLY
808
CONVERT POWER ACCORDING TO THE POWER PARAMETERS FOR TRANSMISSION OVER INTERCONNECT
810
ENCODE ADDITIONAL INFORMATION INTO ANOTHER SERIES OF HIGH-FREQUENCY PULSES BY POWER SUPPLY
812
TRANSMIT SERIES OF HIGH-FREQUENCY PULSES OVER INTERCONNECT
814
RECEIVE SERIES OF HIGH-FREQUENCY PULSES OVER INTERCONNECT ELECTRONIC DEVICE
816
DECODE INFORMATION FROM SERIES OF HIGH-FREQUENCY PULSES BY ELECTRONIC DEVICE
818
ISOLATE SERIES OF HIGH-FREQUENCY PULSES WITHIN DEVICE
820
ISOLATE SERIES OF HIGH-FREQUENCY PULSES WITHIN POWER SUPPLY
822

TRANSMITTING SIGNALS OVER INTERCONNECT CARRYING DIRECT CURRENT FROM POWER SUPPLY TO ELECTRONIC DEVICE

BACKGROUND

Electronic devices, such as computer peripherals like printers, may consume different amounts of power depending on the tasks that they are currently performing. For example, when inkjet and laser printers, as well as other types of image-forming images, are actually printing, they usually consume much more power than when they are not printing. Power supplies for such electronic devices thus provide different amounts of power depending on the tasks being performed by these devices.

To adjust the amount of voltage and/or power provided by the power supplies of such electronic devices, the devices may have internal regulators that regulate the voltage and/or power provided to the devices. This is because many power supplies are manufactured inexpensively, and therefore have unregulated, loosely regulated, or not tightly regulated, nominal voltages and/or powers. However, including regulators within electronic devices can be expensive. For electronic devices that have low profit margins, such as consumer electronic-type devices, as well as some types of image-forming devices, there may be resistance to including such regulators within the electronic devices.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

FIG. 8 is a flowchart of an embodiment of a method, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice these embodiments of the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
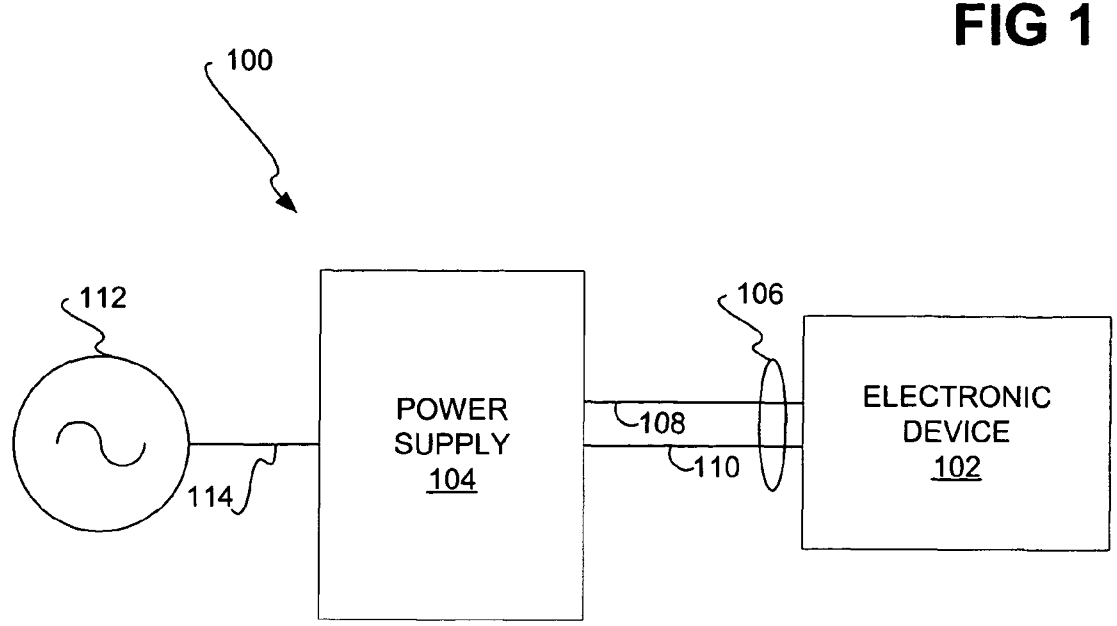
FIG. 1 is a diagram of an embodiment of a system, according to an embodiment of the invention.

FIG. 1 shows a system 100, according to an embodiment of the invention. The system 100 includes an electronic device 102 and a power supply 104. The electronic device 102 performs a principal functionality. For instance, the principal functionality may be image formation, such that the electronic device 102 is an image-forming device, like an inkjet printer, a laser printer, or another type of printing device. The power supply 104 receives alternating current (AC) from a power source 112 and converts the AC to direct current (DC) to power the electronic device 102 so that it can perform its principal functionality. The power supply 104 may be internal or external to the electronic device 102.

The DC is provided by the power supply 104 to the electronic device 102 via an interconnect 106, which may be an insulated cable. The interconnect 106 includes a second conductor 108 and a first conductor 110, the former on which the DC is actually provided, and the latter, which is the return path and which may be connected to ground. The interconnect 106 may also have more than two conductors. The second conductor 108 also may be referred to as the DC rail of the interconnect 106. The power supply 104 receives the AC from the power source 112 via another power line 114. The power line 114 may have two, three, or more conductors, which are not specifically shown in FIG. 1. The power source 112 may, for instance, be a wall outlet, into which the power line 114 is plugged. Alternatively, the power line 114 may not be present, such that the power supply 104 itself directly plugs into the power source 112.

In a different embodiment of the invention, the power supply 104 may be considered to be one stage of a larger power supply, such that it converts DC previously converted from AC by a previous power supply stage to the DC used to power the electronic device 102. In still another embodiment, the power source 112 may provide DC instead of AC, such as when the power source 112 is a battery, such that the power supply 104 may convert such DC to the DC used to power the electronic device. That is, the power line 114 may supply DC or AC, although it is substantially described herein for sake of simplicity as supplying AC.

The electronic device 102 is able to send communication signals over the interconnect 106 to the power supply 104. For example, the electronic device 102 may indicate to the power supply 104 the level of voltage and/or power that is needed, the type of voltage and/or power that is to be supplied to the electronic device 102, the type of voltage and/or power regulation that is provided, as well as other types of communication signals, such as feedback signals and other types of signals. These feedback signals and other types of signals may include signals for controlling voltage and/or power modes, as well as signals regarding peak and/or brownout conditions. The power supply 104 may also be able to send communication signals over the interconnect 106 to the electronic device 102.

The communication signals transmitted over the interconnect 106 may be high-frequency signals, such as high-frequency square, sinusoidal, or triangular signals, as well as other types of waveforms and high-frequency signals. For example, the high-frequency signals may be pulse-width modulation (PWM) signals, or other types of high frequency pulse signals, to encode a desired message. As used herein, the term waveform can in fact encompass multiple waveforms at different frequencies superimposed upon one another, as may be appreciated by those of ordinary skill within the art. Because the DC provided to the electronic device 102 on the interconnect 106 is inherently transmitted at a low frequency, the high-frequency nature of the communication signals allows the communication signals to be sent concurrently with the DC provided to the electronic device 102 on the conductor 108.

System Having Electronic Device and Power Supply

Figure 2:
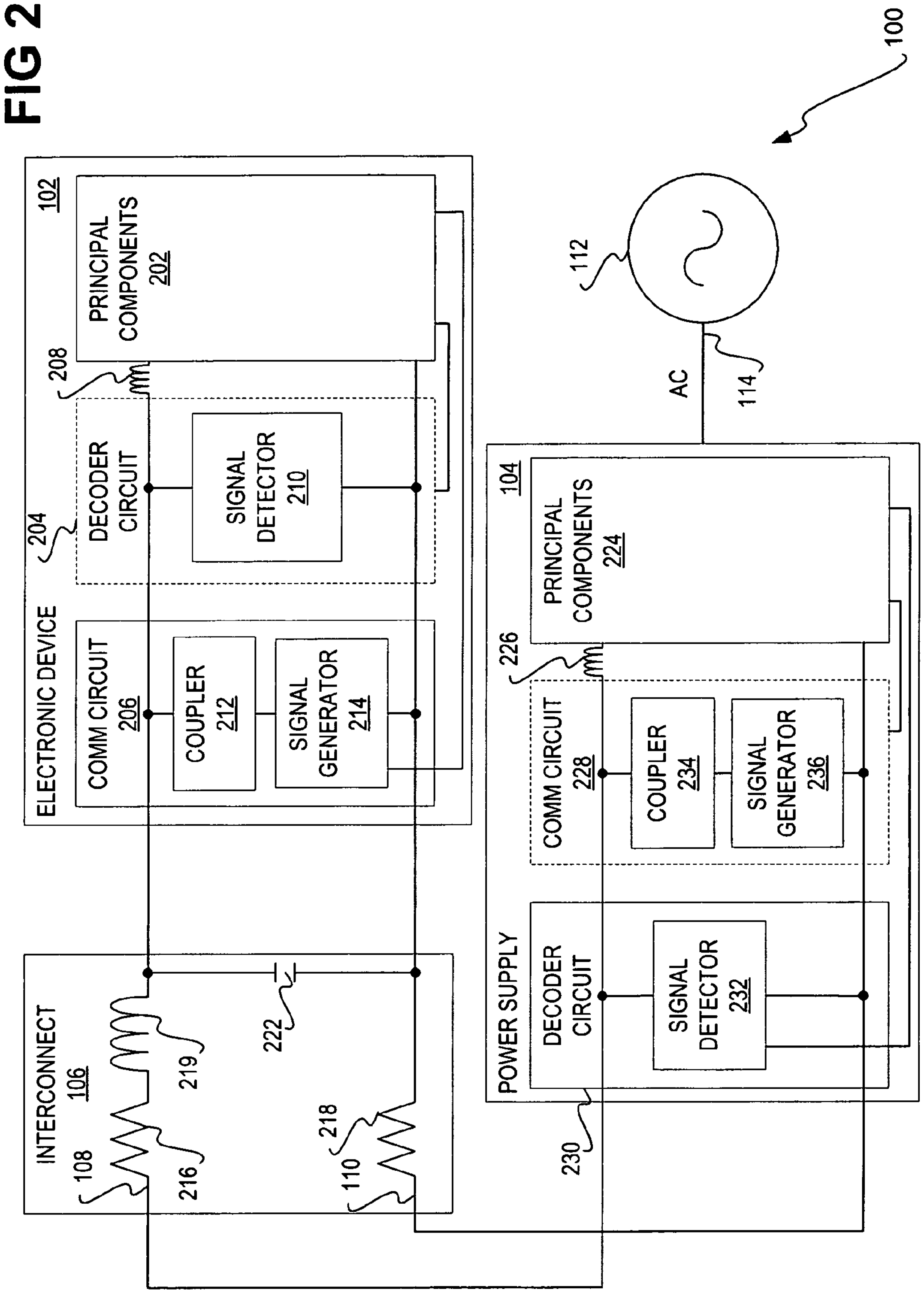
FIG. 2 is a diagram of the embodiment of the system that is more detailed than but consistent with the system of FIG. 1, according to an embodiment of the invention.

FIG. 2 shows the system 100 of FIG. 1 in more detail, according to an embodiment of the invention. As in FIG. 1, the system 100 includes the electronic device 102 and the power supply 104 connected to one another through the interconnect 106, where the power supply 104 is connected to the power source 112 via the power line 114. The power supply 104 converts alternating current (AC) from the power source 112 transmitted over the power line 114 to direct current (DC), and provides the DC over the interconnect 106 to the electronic device 102 so that the device 102 is able to perform its principal functionality. The electronic device 102 is able to send communication signals over the interconnect 106 to the power supply 104. For example, in one embodiment the communication signals may be sent over the second conductor 108 of the interconnect 106. The power supply 104 may also be able to send communication signals to the electronic device 102. Whereas the power supply 104 and the interconnect 106 are depicted in FIG. 2 as external to the electronic device 102, in an alternate embodiment both may be internal to the device 102.

The electronic device 102 includes principal components 202, a decoder circuit 204, a communication circuit 206, and an inductor 208. The principal components 202 include those components that enable the electronic device 102 to perform its principal functionality. For instance, the principal components 202 may be or include image-forming components, such as an inkjet-printing mechanism or a laser-printing mechanism, so that the electronic device 102 is able to perform image formation on media. The principal components 202 utilize the DC received over the interconnect 106 to provide such principal functionality. The inductor 208 is more generally an isolating component or a high-frequency filter, and substantially prevents (or, isolates) the high-frequency communication signals transmitted over the interconnect 106 from interfering with the DC provided to the principal components 202 so that they can perform the principal functionality of the electronic device 102. That is, the inductor 208 attenuates the transmission of high-frequency communication signals to the components 202.

The communication circuit 206 of the electronic device 102 includes a signal generator 214 and a coupler 212. The signal generator 214 receives the information that the principal components 202 of the electronic device 102. In turn, the signal generator 214 generates communication signals to transmit this information to the power supply 104, encoding the information in the process. The communication signals are coupled to the second conductor 108 by the coupler 212, and thus are sent over the second conductor 108 of the interconnect 106 to the power supply 104.

The decoder circuit 204 of the electronic device 102 includes a signal detector 210. The decoder circuit 204 is denoted with dotted lines in FIG. 2 to indicate that it is optional, and does not have to be included within the electronic device 102. The signal detector 210 detects communication signals sent by the power supply 104 over the interconnect 106, and decodes the signals into information that is then provided to the principal components 202.

The interconnect 106 is depicted in FIG. 2 as including resistors 216 and 218, inductor 219, and a capacitor 222. The interconnect 106 may be treated as a transmission line having resistance, inductance, and capacitance that may be considered when communicating signals over the interconnect 106. As a result, the resistor 216 discretely represents the inherent resistance of the second conductor 108 of the interconnect 106. The resistor 218 likewise discretely represents the inherent resistance of the first conductor 110 of the interconnect 106. The capacitor 222 discretely represents the inherent capacitance between the conductors 108 and 110. The inductor 219 discretely represents the inductance of the conductors 108 and 110. Although the interconnect 106 is depicted in FIG. 2 as being external to both the electronic device 102 and the power supply 104, in differing embodiments of the invention the interconnect 106 may alternatively be internal to either the electronic device 102 or the power supply 104.

The power supply 104 includes principal components 224, a decoder circuit 230, a communication circuit 228, and an inductor 226. The principal components 224 include those components that enable the power supply 104 to convert the AC provided by the power source 112 over the power line 114 into the DC provided to the electronic device 102 over the interconnect 106. The principal components 224 may thus include a transformer. The inductor 226 is more generally an isolating component, or a high-frequency filter, and substantially prevents (or, isolates) the high-frequency communication signals transmitted over the interconnect 106 from interfering with the DC generated by the principal components 224 so that their conversion of AC to DC is not affected. That is, the inductor 226 attenuates the transmission of the high-frequency communication signals to the components 224.

The decoder circuit 230 of the power supply 104 includes a signal detector 232. The signal detector 232 detects communication signals sent by the electronic device 102 over the interconnect 106, and decodes the signals into information that is then provided to the principal components 224. For example, the high-frequency communication signals sent by the electronic device 102 may encode parameters in accordance with which the principal components 224 convert AC to DC for transmission over the interconnect 106 to the electronic device 102. These parameters may indicate the amount and nature of the power that the electronic device 102 is requesting that the power supply 104 provide.

The communication circuit 228 of the power supply 104 includes a signal generator 236 and a coupler 234. The communication circuit 228 is denoted with dotted lines in FIG. 2 to indicate that it is optional, and does not have to be included within the power supply 104. The signal generator 236 receives the information that the principal components 224 of the power supply 104 wish to transmit to the electronic device 102. In turn, the signal generator 236 generates communication signals that encode this information. The communication signals are coupled to the second conductor 108 by the coupler 234, and thus are sent over the second conductor 108 of the interconnect 106 to the electronic device 102.

Communication Circuit

Figures 3, 4:
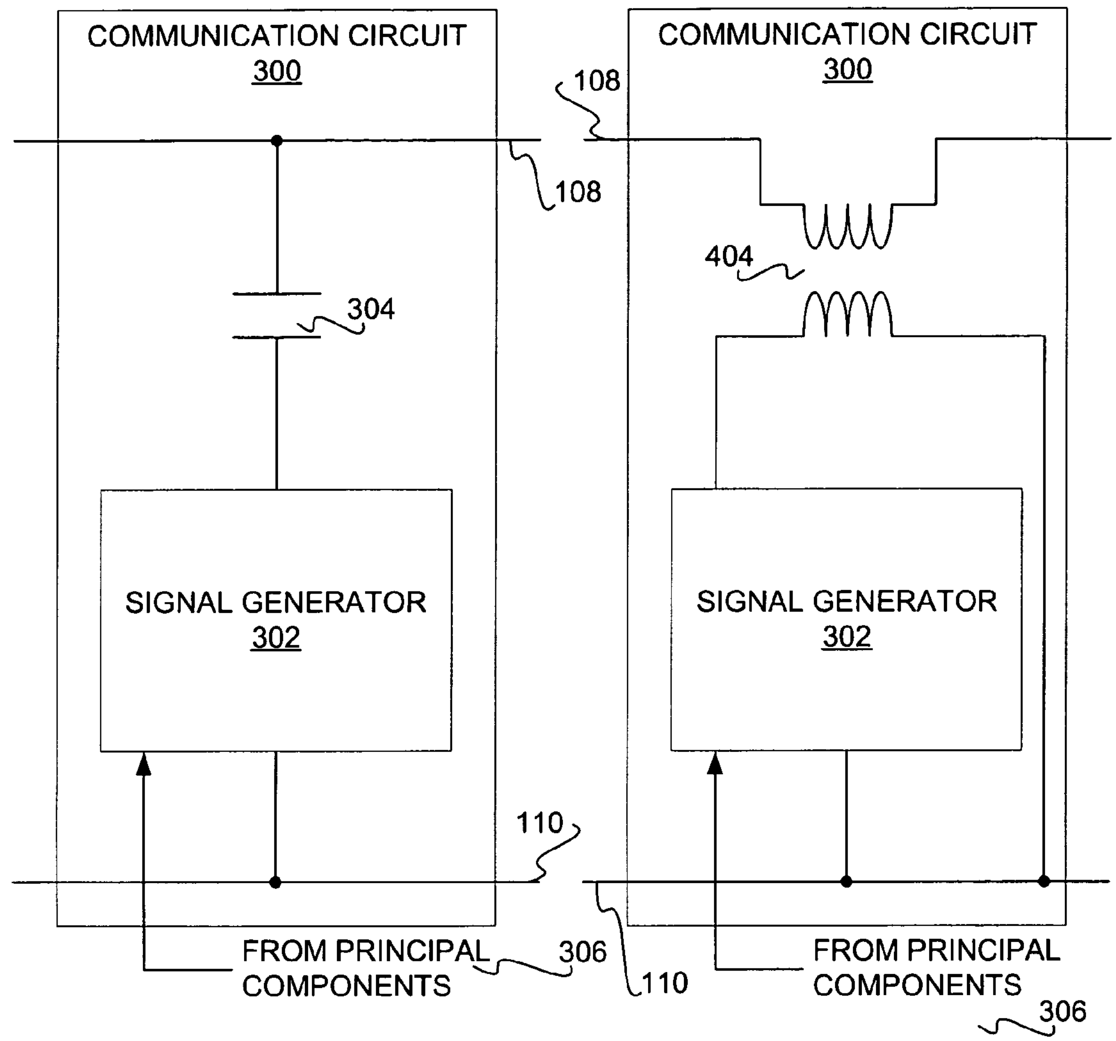
FIGS. 3 and 4 are diagrams of different embodiments of communication circuits that may be employed in the systems of FIGS. 1 and 2, according to varying embodiments of the invention.

FIGS. 3 and 4 show a communication circuit 300, according to different embodiments of the invention. The communication circuit 300 of FIG. 3 or 4 may implement the communication circuit 206 of the electronic device 102 of FIG. 2, and/or the communication circuit 228 of the power supply 104 of FIG. 2. In general, the communication circuit 300 transmits high-frequency communication signals from the principal components over the interconnect 106, which do not significantly interfere with the direct current (DC) carried by the interconnect 106, because the DC is inherently low frequency. FIG. 3 specifically depicts the coupling of voltage for signal coupling, whereas FIG. 4 specifically depicts magnetic coupling of voltage for signal coupling.

In FIG. 3, the signal generator 302 receives information from the principal components and generates a square waveform, a triangular waveform, a sinusoidal waveform, a pulse-width modulated (PWM) waveform, or another type of waveform, to transmit over the interconnect 106, as indicated by the reference number 306. This waveform is then coupled to the electric field of the interconnect 106 via the capacitor 304, such that coupling of a voltage is achieved to yield communication signal transmission over the interconnect 106. The capacitor 304 may serve as the coupler 212 or the coupler 234 of FIG. 2. The signal generator 302 is connected between the first conductor 110 and the capacitor 304, which is itself connected to the second conductor 108.

In FIG. 4, the signal generator 302 again generates a type of waveform based on the information that is to sent by the principal components to be transmitted over the power line, as indicated by the reference number 306. The waveform is coupled to the magnetic field of the interconnect 106 via the inductive transformer 404, such that magnetic field coupling, or alternating current (AC) coupling, is achieved to yield communication signal transmission over the interconnect 106. The inductive transformer 404 may serve as the coupler 212 or the coupler 234 of FIG. 2. The signal generator is connected between the first conductor 110 and one side of the inductive transformer 404, whereas the other side of the inductive transformer 404 is connected to the second conductor 108. Alternatively, the waveform may be coupled as a voltage, or injected as a current or as voltage variations, over the second conductor 108. It is noted that, in general, the waveform output by the signal generator 302 can be output as either a voltage source or a current source.

Decoder Circuit

Figure 5:
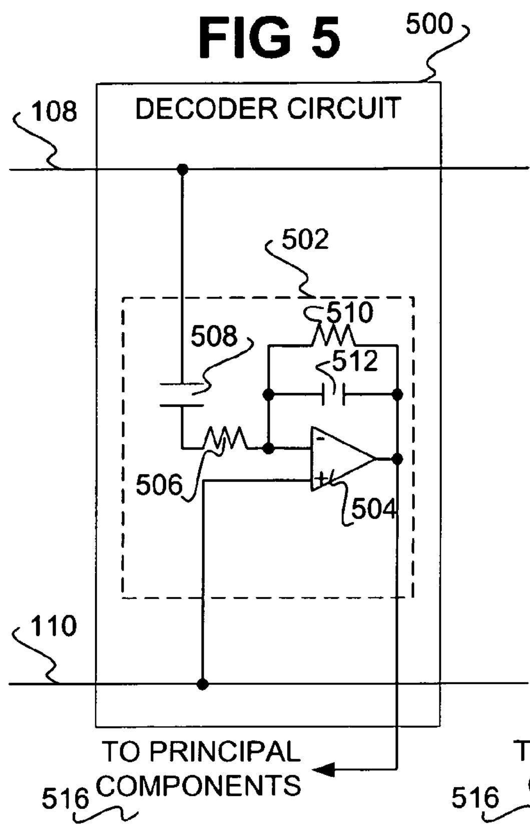
FIGS. 5, 6, and 7 are diagrams of different embodiments of decoder circuits that may be employed in the embodiments of the systems of FIGS. 1 and 2, according to varying embodiments of the invention.
Figure 6:
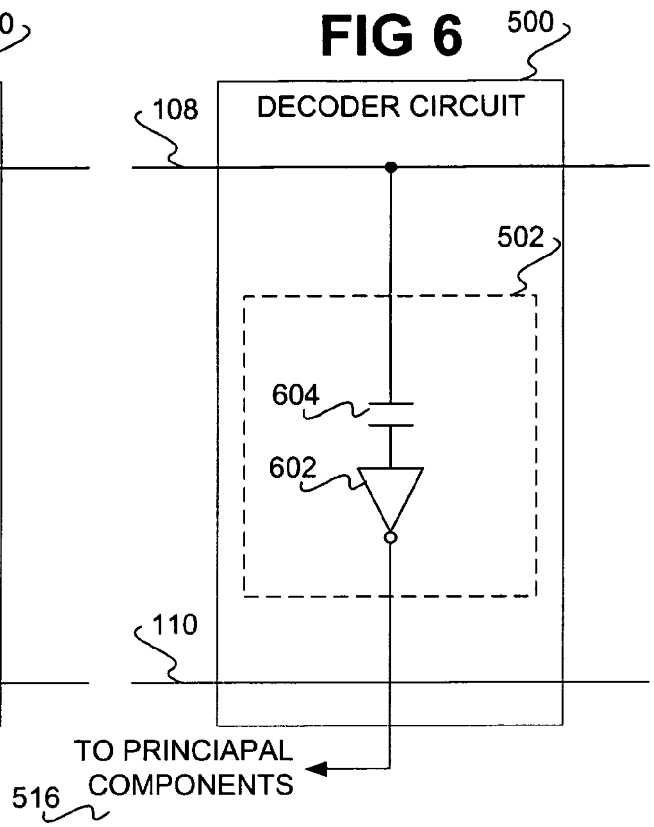
Figure 7:
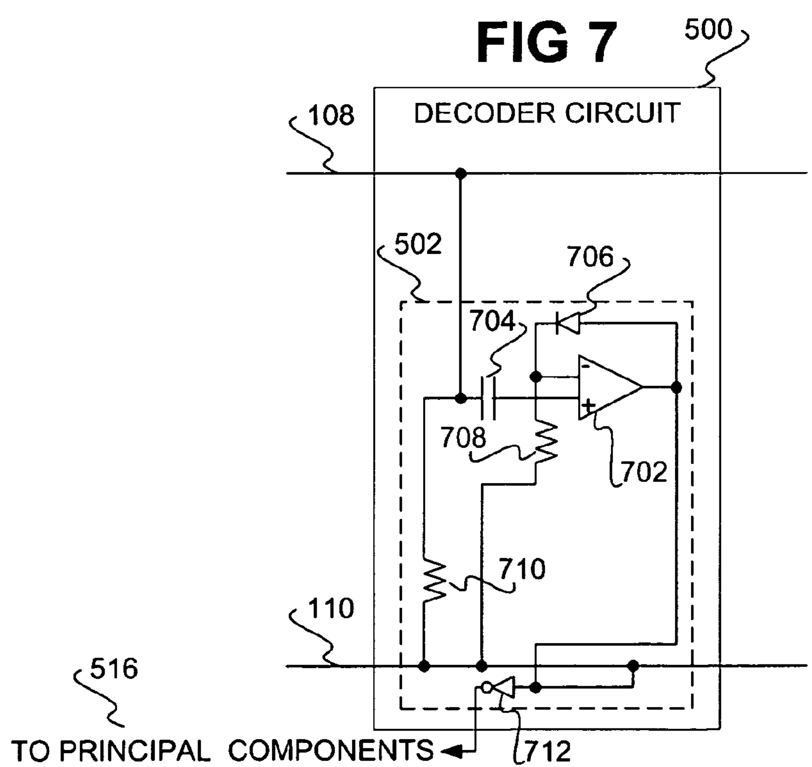

FIGS. 5, 6, and 7 show a decoder circuit 500, according to different embodiments of the invention. The decoder circuit 500 of FIG. 5, 6, or 7 may implement the decoder circuit 204 of the electronic device 102 of FIG. 2, and/or may implement the decoder circuit 230 of the power supply 104 of FIG. 2. In general, the decoder circuit 500 receives and decodes high-frequency communication signals over the interconnect 106, which do not significantly interfere with the direct current (DC) carried to the electronic device 102 by the interconnect 106, because the DC is inherently low frequency.

In FIG. 5, the decoder circuit 500 has a signal detector 502 that is able to detect and decode a magnetic field-coupled, a voltage-coupled, a current-coupled or an alternating current (AC)-coupled, pulse-width modulated (PWM) or square waveform, from the communication signals received over the interconnect 106. The decoded information is then transmitted to the principal components, as indicated by the reference number 516. The signal detector 502 includes an operational amplifier (op amp) 504, resistors 506 and 510, and capacitors 508 and 512, that are connected together as a basic integrator circuit, such that the decoder circuit 500 can be considered an integrator. The negative input of the op amp 504 have the resistor 506 and the capacitor 508 connected in series to the second conductor 108. Furthermore, the resistor 510 and the capacitor 512 are connected in parallel between the negative input of the op amp 504 and the output of the op amp 504. The output of the op amp 504 is further connected to the principal components, as indicated by the reference number 516. The positive input of the op amp 504 is connected to the first conductor 110.

In FIG. 6, the signal detector 502 of the decoder circuit 500 is able to detect and decode a magnetic field-coupled, or AC-coupled, triangular waveform from the communication signals received over the interconnect 106. As before, the decoded information is transmitted to the principal components, as indicated by the reference number 516. The signal detector 502 includes a capacitor 604 and an inverter 602, such as with hysteresis, connected in series between the second conductor 108 and the principal components, as indicated by the reference number 516.

In FIG. 7, the signal detector 502 of the decoder circuit 500 is able to detect and decode a magnetic field-coupled, or AC-coupled, sinusoidal waveform from the communication signals received over the interconnect 106. As before, the decoded information is transmitted to the principal components, as indicated by the reference number 516. The signal detector 502 includes an op amp 702, a capacitor 704, a rectifier, or diode, 706, a resistor 708 and an inverter 712. The negative input of the op amp 702 is connected to the resistor 708. The resistor 710 is connected between the capacitor 704 and the conductor 110. The rectifier, or diode, 706 is connected between the output of the op amp 702 and the negative input of the op amp 702. The positive input of the op amp 702 is connected to a capacitor 704, which is itself connected to the second conductor 108. The inverter 712, such as one having hysteresis, is connected between the first conductor 110 and the principal components, as indicated by the reference number 516.

Method

FIG. 8 shows a method 800 for transmitting information between the electronic device 102 and the power supply 104 over the interconnect 106, according to a specific embodiment of the invention. For instance, power parameters are encoded by the electronic device 102 into a series of high-frequency pulses (802). The high-frequency pulses may be a pulse-width modulated (PWM) waveform, a triangular waveform, a square waveform, a sinusoidal waveform, or another type of waveform. For example, where the high-frequency pulses are a PWM waveform, the power parameters are pulse-width modulated by the electronic device 102 into the pulses. The series of high-frequency pulses is transmitted over the interconnect 106 by the electronic device 102 (804).

The series of high-frequency pulses is then received by the power supply 104 for the electronic device 102 over the interconnect 106 (806). The power supply 104 decodes the power parameters from the series of high-frequency pulses (808). The power supply 104 may thus convert alternating current (AC) direct current (DC) to DC or AC according to these power parameters, for transmission over the interconnect 106 (810).

The power supply 104 also may itself encode information in a series of high-frequency pulses (812). This series of high-frequencies pulses is also transmitted over the interconnect 106 (814). The electronic device 102 receives the series of high-frequency pulses over the interconnect 106 (816), and decodes the information from the series of pulses (818). Information can thus be transmitted from the electronic device 102 to the power supply 104, and/or from the power supply 104 to the electronic device 102.

Furthermore, the series of high-frequency pulses may be isolated from the primary components 206 within the electronic device 102 (820), as well as from the primary components 224 within the power supply 104 (822). For example, in FIG. 2, the inductor 208 of the electronic device 102 isolates the high-frequency pulses from significantly affecting or being significantly transmitted to the principal components 202 of the device 102. Similarly, in FIG. 2, the inductor 226 of the power supply 104 isolates the high-frequency pulses from affecting or being transmitted to the principal components 224 of the power supply 104.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A system comprising:

an interconnect to carry direct current (DC), the interconnect having a first conductor and a second conductor;

an electronic device connectable to the interconnect to receive DC and having a communication circuit to transmit signals over the interconnect; and, a power supply connectable to the interconnect to provide the DC to the electronic device and having a decoder circuit to decode the signals received over the interconnect from the electronic device, where the decoder circuit is part of the power supply, wherein the decoder circuit is one of:

a first decoder circuit comprising:

a first operational amplifier having a positive input, a negative input, and an output, the positive input connected to the second conductor;

a first capacitor and a first resistor connected in series between the first conductor and the negative input of the first operational amplifier;

a second capacitor and a second resistor connected in parallel between the negative input and the output of the first operational amplifier;

a second decoder circuit comprising:

a first inverter;

a third capacitor connected in series between the first conductor and the first inverter;

a third decoder circuit comprising:

a second operational amplifier having a positive input, a negative input, and an output, the output connected to the second conductor;

a diode connected between the output of the second operational amplifier and the negative input of the second operational amplifier;

a third resistor connected between the second conductor and the negative input of the second operational amplifier;

a fourth resistor connected between the first conductor and the second conductor;

a fourth capacitor connected between the first conductor and the positive input of the second operational amplifier;

a second inverter connected to the second operational amplifier.

2. The system of claim 1, wherein the power supply further has a communication circuit to transmit additional communication signals over the interconnect, and the electronic device further has a decoder circuit to decode the additional communication signals received over the interconnect from the power supply.

3. The system of claim 1, wherein the communication signals are one of high-frequency pulse-width modulation (PWM) signals and high-frequency square-wave signals.

4. The system of claim 1, wherein the communication signals are high-frequency sinusoidal signals.

5. The system of claim 1, wherein the communication signals are high-frequency triangular signals.

6. The system of claim 1, wherein the electronic device comprises at least one isolating component to substantially isolate the communication signals from components of the electronic device other than the communication circuit.

7. The system of claim 1, wherein the electronic device is an image-forming device.

8. The system of claim 1, wherein the power supply comprises at least one isolating component to substantially isolate the communication signals from components of the power supply other than the decoder circuit.

9. The system of claim 1, wherein the power supply and the interconnect are internal to the electronic device.

10. The system of claim 1, wherein the power supply and the interconnect are external to the electronic device.

11. The system of claim 1, wherein the decoder circuit is the first decoder circuit.

12. The system of claim 1, wherein the decoder circuit is the second decoder circuit.

13. The system of claim 1, wherein the decoder circuit is the third decoder circuit.

14. A system comprising:

a direct current (DC) interconnect having a first conductor and a second conductor;

an electronic device having a principal functionality and connectable to the interconnect to receive DC and comprising:

one or more components to provide the principal functionality of the electronic device;

a pulse-width modulation (PWM) communication circuit to transmit high-frequency PWM signals over the interconnect;

an inductive isolating component to substantially isolate the high-frequency PWM signals from the one or more components of the electronic device; and, a power supply connectable to the interconnect to convert alternating current (AC) from a power source to DC for the electronic device and comprising:

one or more components to convert the AC to the DC according to one or more parameters;

a decoder circuit to decode the high-frequency PWM signals received over the interconnect from the electronic device into the one or more parameters;

an inductive isolating component to substantially isolate the high-frequency PWM signals from the one or more components of the power supply, wherein the decoder circuit is one of:

a first decoder circuit comprising:

a first operational amplifier having a positive input, a negative input, and an output, the positive input connected to the second conductor;

a first capacitor and a first resistor connected in series between the first conductor and the negative input of the first operational amplifier;

a second capacitor and a second resistor connected in parallel between the negative input and the output of the first operational amplifier;

a second decoder circuit comprising:

a first inverter;

a third capacitor connected in series between the first conductor and the first inverter;

a third decoder circuit comprising:

a second operational amplifier having a positive input, a negative input, and an output, the output connected to the second conductor;

a diode connected between the output of the second operational amplifier and the negative input of the second operational amplifier;

a third resistor connected between the second conductor and the negative input of the second operational amplifier;

a fourth resistor connected between the first conductor and the second conductor;

a fourth capacitor connected between the first conductor and the positive input of the second operational amplifier;

a second inverter connected to the second operational amplifier.

15. The system of claim 14, wherein the power supply further comprises a PWM communication circuit to transmit additional high-frequency PWM signals over the interconnect, and the electronic device further comprises a decoder circuit to decode the additional high-frequency PWM signals received over the interconnect from the power supply.

16. The system of claim 14, wherein the inductive isolating component of the electronic device and the inductive isolating component of the power supply each comprises an inductor.

17. The system of claim 14, wherein the electronic device is an image-forming device.

18. The system of claim 14, wherein the decoder circuit is the first decoder circuit.

19. The system of claim 14, wherein the decoder circuit is the second decoder circuit.

20. The system of claim 14, wherein the decoder circuit is the third decoder circuit.

21. A power supply comprising:

a decoder circuit to decode high-frequency communication signals received an interconnect into one or more parameters, the interconnect having a first conductor and a second conductor;

one or more components to convert alternating current (AC) from a power source to direct current (DC) for transmission over the interconnect according to the one or more parameters; and, a high-frequency filter operatively coupled between the decoder circuit and the one or more components to attenuate transmission of high-frequency communication signals to the one or more components wherein the decoder circuit is one of:

a first decoder circuit comprising:

a first operational amplifier having a positive input, a negative input, and an output, the positive input connected to the second conductor;

a first capacitor and a first resistor connected in series between the first conductor and the negative input of the first operational amplifier;

a second capacitor and a second resistor connected in parallel between the negative input and the output of the first operational amplifier;

a second decoder circuit comprising:

a first inverter;

a third capacitor connected in series between the first conductor and the first inverter;

a third decoder circuit comprising:

a second operational amplifier having a positive input, a negative input, and an output, the output connected to the second conductor;

a diode connected between the output of the second operational amplifier and the negative input of the second operational amplifier;

a third resistor connected between the second conductor and the negative input of the second operational amplifier;

a fourth resistor connected between the first conductor and the second conductor;

a fourth capacitor connected between the first conductor and the positive input of the second operational amplifier;

a second inverter connected to the second operational amplifier.

22. The power supply of claim 21, further comprising a high-frequency communication circuit to transmit additional high-frequency communication signals over the interconnect.

23. The power supply of claim 21, further comprising the interconnect.

24. The power supply of claim 21, wherein the high-frequency filter comprises an inductor.

25. The power supply of claim 21, wherein the high-frequency communication signals comprise one of: pulse-width modulation (PWM) signals, square-wave signals, sinusoidal signals, and triangle-wave signals.

26. The power supply of claim 21, wherein the decoder circuit is the first decoder circuit.

27. The power supply of claim 21, wherein the decoder circuit is the second decoder circuit.

28. The power supply of claim 21, wherein the decoder circuit is the third decoder circuit.

* * * * *

UNITED STATES PATENT AND TRADEMARK OFFICE

CERTIFICATE OF CORRECTION

PATENT NO. : 7,800,253 B2
APPLICATION NO. : 10/743230
DATED : September 21, 2010
INVENTOR(S) : Nikholas Hubbard et al.

It is certified that error appears in the above-identified patent and that said Letters Patent is hereby corrected as shown below:

In column 9, line 46, in Claim 21, delete “components” and insert -- components, --, therefor.

Signed and Sealed this
Nineteenth Day of April, 2011

David J. Kappos
*Director of the United States Patent and Trademark Office*